US012809562B2

(12) United States Patent
Shiraga

(10) Patent No.: US 12,809,562 B2
(45) Date of Patent: Nov. 24, 2026

(54) PRINTER, NON-TRANSITORY COMPUTER-READABLE RECORDING MEDIUM STORING COMPUTER READABLE INSTRUCTIONS FOR PRINTER, AND METHOD FOR CONTROLLING PRINTER

(71) Applicant: BROTHER KOGYO KABUSHIKI KAISHA, Nagoya (JP)

(72) Inventor: Naoto Shiraga, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 295 days.

(21) Appl. No.: 18/624,745

(22) Filed: Apr. 2, 2024

(65) Prior Publication Data

US 2024/0329896 A1 Oct. 3, 2024

(30) Foreign Application Priority Data

Apr. 3, 2023 (JP) ................................ 2023-060412
Nov. 22, 2023 (JP) ................................ 2023-198346
Jan. 30, 2024 (JP) ................................ 2024-011643

(51) Int. Cl.
*G06F 3/12* (2006.01)
*H04N 1/34* (2006.01)

(52) U.S. Cl.
CPC .......... *G06F 3/1228* (2013.01); *G06F 3/1204* (2013.01); *G06F 3/1239* (2013.01); *G06F 3/1276* (2013.01); *G06F 3/1288* (2013.01); *H04N 1/346* (2013.01)

(58) Field of Classification Search
CPC .... G06F 3/1228; G06F 3/1204; G06F 3/1239; G06F 3/1276; G06F 3/1288; H04N 1/346
USPC ........................................ 382/1.15; 358/1.15
See application file for complete search history.

(56) References Cited

U.S. PATENT DOCUMENTS

2007/0162480 A1* 7/2007 Garg .................. G03G 15/5079
2008/0278754 A1 11/2008 Hibino
2017/0161719 A1* 6/2017 Bhatia .................. G06Q 20/327
2020/0174718 A1 6/2020 Yamada
2022/0179603 A1 6/2022 Sako et al.
2023/0367530 A1 11/2023 Sako et al.

FOREIGN PATENT DOCUMENTS

JP 2004126789 A * 4/2004
JP 2008-283438 A 11/2008
JP 2016136327 A 7/2016
JP 2020087255 A 6/2020
JP 2021140219 A 9/2021
JP 2022-089143 A 6/2022

* cited by examiner

*Primary Examiner* — Charlotte M Baker
(74) *Attorney, Agent, or Firm* — Kenealy Vaidya LLP

(57) ABSTRACT

A printer may comprise: a print execution device; and a controller, wherein the controller may be configured to: in a case where a print execution instruction is received from a terminal device, cause the print execution device to execute printing of an image according to the print execution instruction; and in a case where the print execution instruction is received from the terminal device and the print execution instruction is generated by a general-purpose driver not provided by a vendor of the printer, externally send predetermined information related to a subscription to a service related to the printer.

17 Claims, 8 Drawing Sheets

(Case A)

(Continuation of FIG. 3)

(Case B-1(First and second Embodiments))

Same as T70 to T82 of FIG. 3 and T90 to T142 of FIG. 4

(Case B-2 (Third Embodiments))

Same as T70 to T82 of FIG. 3 and T90 to T142 of FIG. 4

(Case B-3(Fourth Embodiment)

PRINTER, NON-TRANSITORY COMPUTER-READABLE RECORDING MEDIUM STORING COMPUTER READABLE INSTRUCTIONS FOR PRINTER, AND METHOD FOR CONTROLLING PRINTER

REFERENCE TO RELATED APPLICATIONS

This application claims priority from Japanese Patent Application No. 2023-060412 filed on Apr. 3, 2023, Japanese Patent Application No. 2023-198346 filed on Nov. 22, 2023, and Japanese Patent Application No. 2024-011643 filed on Jan. 30, 2024. The entire contents of the priority applications are incorporated herein by reference.

BACKGROUND ART

A printer that can print by both a standard driver used for any model and a vendor-specific driver provided by a vendor of the printer is known.

SUMMARY

The present disclosure provides a technique that can properly prompt a user to subscribe to a service related to a printer.

A printer disclosed herein may comprise: a print execution device; and a controller, wherein the controller may be configured to: in a case where a print execution instruction is received from a terminal device, cause the print execution device to execute printing of an image according to the print execution instruction; and in a case where the print execution instruction is received from the terminal device and the print execution instruction is generated by a general-purpose driver not provided by a vendor of the printer, externally send predetermined information related to a subscription to a service related to the printer.

The above printer externally sends the predetermined information related to the subscription to the service related to the printer in the case where the print execution instruction is generated by the general-purpose driver. Consequently, a user who uses the general-purpose driver to cause the printer to execute printing can suitably be prompted to subscribe to the service.

A computer program for realizing the above printer and a computer-readable recording medium storing the above computer program are also novel and useful. A method for controlling the above printer is also novel and useful.

DESCRIPTION

Figure 1:
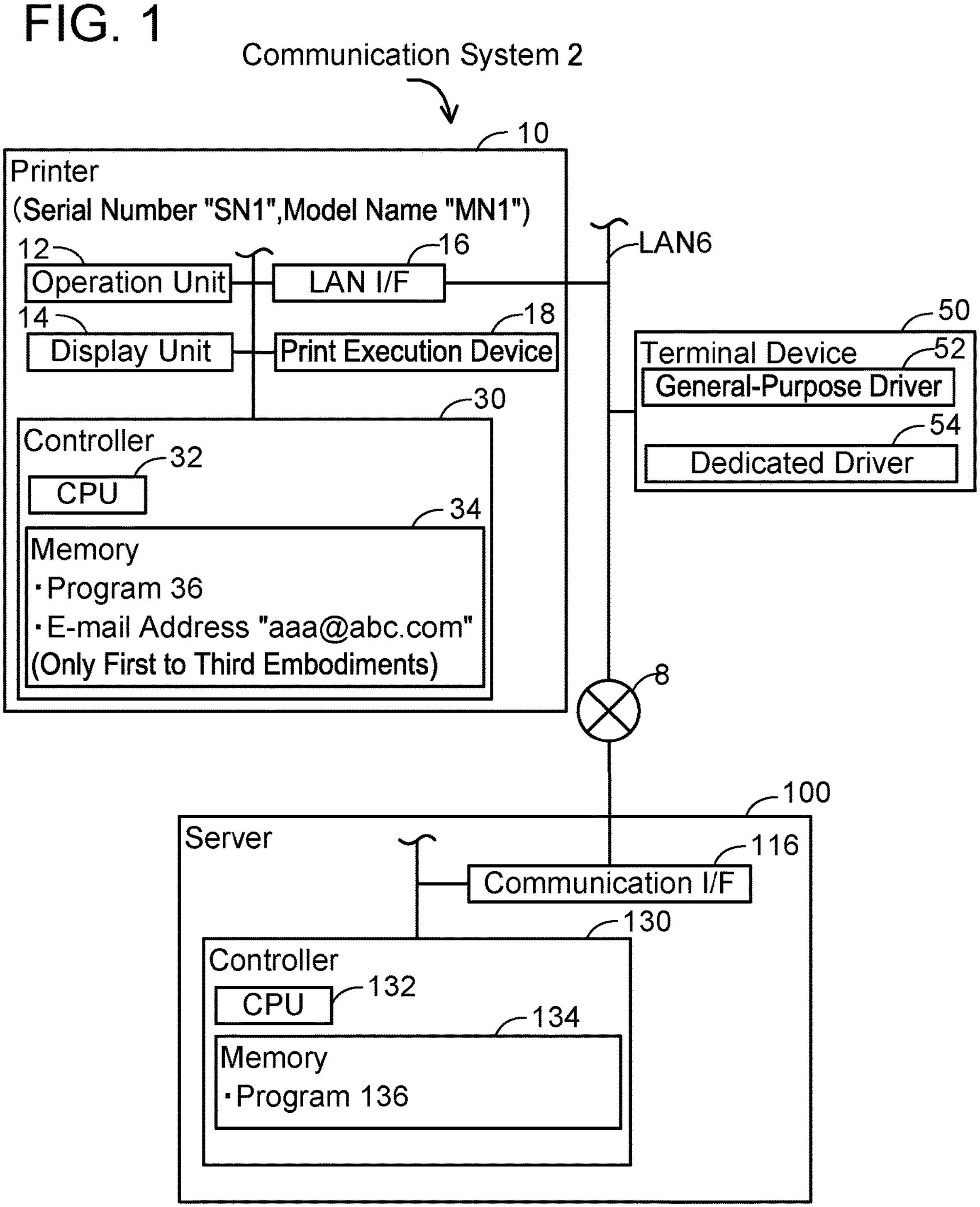
FIG. 1 illustrates a configuration of a communication system.

First Embodiment (Configuration of Communication System 2; FIG. 1)

As illustrated in FIG. 1, a communication system 2 includes a printer 10, a terminal device 50, and a server 100. The devices 10, 50 are connected to a LAN 6 and configured to communicate with each other via the LAN 6. The LAN 6 may be a wired LAN or a wireless LAN. The devices 10, 50 are configured to communicate with the server 100 mutually via the Internet 8.

(Configuration of Printer 10)

The printer 10 is a peripheral device configured to execute a printing function (e.g., a peripheral device of the terminal device 50). In a modification, the printer 10 may be a multifunctional machine configured to execute a scanning function, a facsimile function, etc., in addition to a printing function. The printer 10 includes an operation unit 12, a display unit 14, a LAN interface 16, a print execution device 18, and a controller 30. The units 12-30 are connected to bus lines (reference sign omitted). In the following, the interface is simply described as "I/F".

The operation unit 12 includes a plurality of keys. A user can input various instructions to the printer 10 by operating the operation unit 12. The display unit 14 is a display that displays various information. The display unit 14 also functions as a so-called touch screen (i.e., an operation unit which accepts operation by the user). The LAN I/F 16 is connected to the LAN 6. The print execution device 18 includes a printing mechanism of an inkjet scheme. The printing mechanism may be referred to as a "print engine". In a modification, the print execution device 18 may include a printing mechanism of a scheme different from the inkjet scheme, for example, a laser scheme or a thermal scheme.

The controller 30 includes a CPU 32 and a memory 34. The CPU 32 executes various processes according to a program 36 stored in the memory 34. The memory 34 is configured of a volatile memory, a nonvolatile memory, and the like.

A model name of the printer 10 is MN1 and a serial number SN1 is assigned to the printer 10. In addition to the model name MN1 and the serial number SN1, the memory 34 further stores an email address "aaa@abc.com". The email address "aaa@abc.com" is an email address of the user of the printer 10 and is entered by the user during the initial setup of the printer 10.

(Configuration of Server 100)

The server 100 is a server that provides a service related to a printer. The service is, for example, a subscription service that allows printing up to the contractual number of sheets set in each predetermined period (e.g., one month) at a fixed rate. If the number of sheets printed in the predetermined period exceeds the contractual number of sheets, the user pays an additional fee (e.g., a fee obtained by multiplying a difference between the number of sheets printed and the contractual number of sheets by a unit price). The contractual number of sheets may vary depending on contracted plans.

The server 100 includes a communication I/F 116 and a controller 130. The units 116, 130 are connected to bus lines (reference sign omitted). The communication I/F 116 is connected to the Internet 8.

The controller 130 includes a CPU 132 and a memory 134. The CPU 132 executes various processes according to a program 136 stored in the memory 134. The memory 134 is configured of a volatile memory, a nonvolatile memory, and the like.

(Configuration of Terminal Device 50)

The terminal device 50 is a user terminal such as a desktop PC, laptop PC, tablet PC, or cell phone (e.g., smartphone). The terminal device 50 includes a general-purpose driver 52 and a dedicated driver 54. Each driver 52, 54 is software for converting target data representing an image to be printed and generating print data having a data format that can be interpreted by the printer 10.

The general-purpose driver 52 is a printer driver provided by a provider different from the vendor of the printer 10. The general-purpose driver 52 can cause various printers manufactured by different printer vendors to execute printing. In this embodiment, the general-purpose driver 52 is a driver that causes a printer to execute printing according to the Internet Printing Protocol (IPP) scheme, for example, AirPrint or Mopria. AirPrint is a registered trademark of Apple Inc. Mopria is a registered trademark of Mopria Alliance Incorporated. In a modification, the general-purpose driver 52 may be a driver that causes a printer to execute printing according to a scheme different from the IPP scheme.

The dedicated driver 54 is a printer driver provided by the vendor of the printer 10. The dedicated driver 54 is a dedicated printer driver for the printer having the model name MN1. In particular, the dedicated driver 54 needs to be used instead of the general-purpose driver 52 to cause the printer 10 to execute printing using the subscription service described above. Since the dedicated driver 54 is dedicated for the printer 10, it can send some sort of notification to the printer 10 and cause the printer 10 to display the notification. For example, the dedicated driver 54 can cause the printer 10 to display a notification prompting the user to subscribe to the subscription service. On the other hand, the general-purpose driver 52 cannot send to the printer 10 a notification for display.

Figure 2:
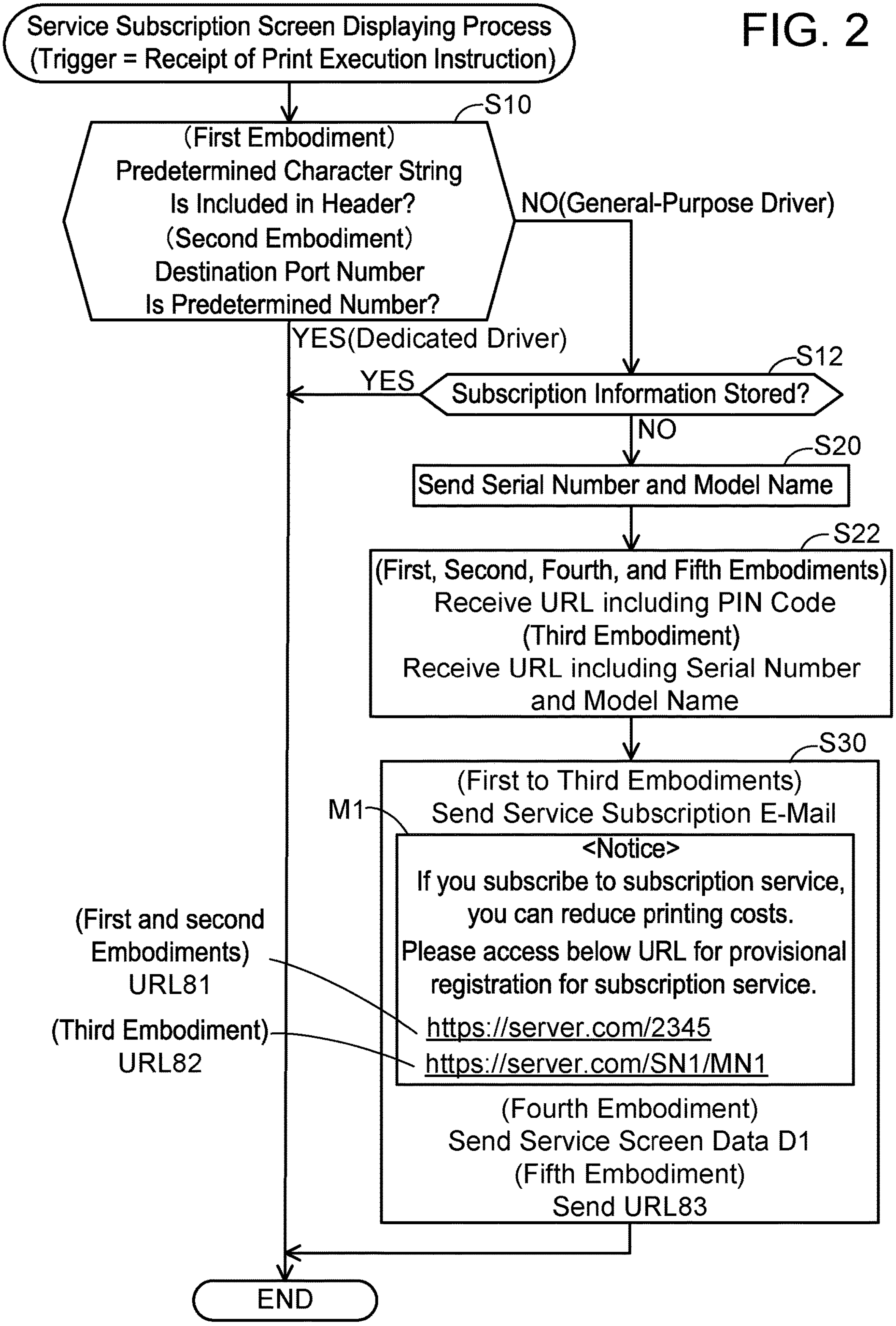
FIG. 2 illustrates a flowchart of a service subscription screen displaying process.

(Service Subscription Screen Displaying Process: FIG. 2)

Referring to FIG. 2, a service subscription screen displaying process executed by the CPU 32 of the printer 10 will be described. Start of the process of FIG. 2 is triggered by receipt of a print execution instruction including print data from the terminal device 50.

In S10, the CPU 32 determines whether a header part of the print execution instruction includes a predetermined character string (e.g., "V1"). Here, the character string "V1" is information for identifying the vendor of the printer 10 and is stored in advance in the memory 34 of the printer 10. Therefore, the fact that the header part includes the predetermined character string means that the print execution instruction is generated by the dedicated driver 54. When the header part does not include the predetermined character string, it means that the print execution instruction is generated by the general-purpose driver 52. The CPU 32 can appropriately determine whether the print execution instruction is generated by the dedicated driver 54 or the general-purpose driver 52 based on the character string included in the header part.

The CPU 32 determines YES at S10 and ends the process of FIG. 2 when the header part includes the predetermined character string, that is, when the print execution instruction is generated by the dedicated driver 54. The CPU 32 determines NO at S10 and proceeds to S12 when the header part does not include the predetermined character string, that is, when the print execution instruction is generated by the general-purpose driver 52.

In S12, the CPU 32 determines whether subscription information is stored in the memory 34. The subscription information is information indicating that the user of the printer 10 (including both an individual and a company) has already subscribed to the subscription service described above. When the subscription information is stored in the memory 34, the CPU 32 determines YES at S12 and ends the process of FIG. 2. In this way, it is possible to suppress the user who has already subscribed to the subscription service from feeling that receiving a service subscription e-mail to be described below is bothersome. The CPU 32 determines NO at S12 and proceeds to S20 when the subscription information is not stored in the memory 34.

At S20, the CPU 32 sends the serial number SN1 and the model name MN1 to the server 100. Consequently, information necessary to subscribe to the subscription service is stored (i.e., provisionally registered) in the server 100. In particular, in the server 100, a PIN code is generated and the serial number SN1 and the model name MN1 are stored in association with the PIN code.

Next, at S22, the CPU 32 receives a URL from the server 100. The URL includes address information of the server 100 and the PIN code described above.

At S30, the CPU 32 sends a service subscription e-mail M1 with the e-mail address "aaa@abc.com" in the memory 34 as a recipient. The service subscription e-mail M1 includes a message prompting the user to subscribe to the subscription service, a message prompting the user to select a URL 81 for provisional registration for the subscription service, and the URL 81 received at S22. When S30 ends, the CPU 32 ends the process of FIG. 2.

Figure 3:
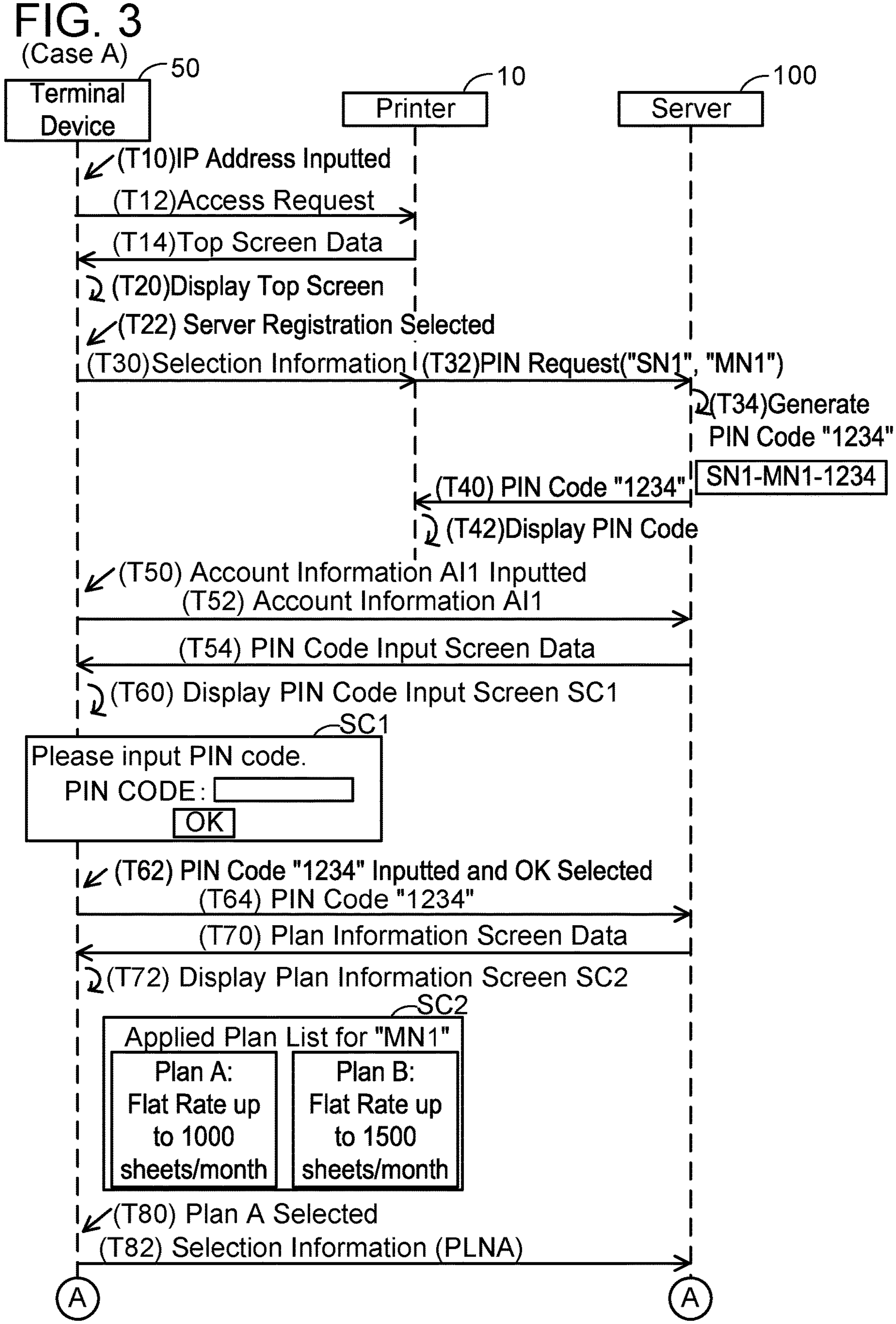
FIG. 3 illustrates a sequence diagram of Case A.
Figure 4:
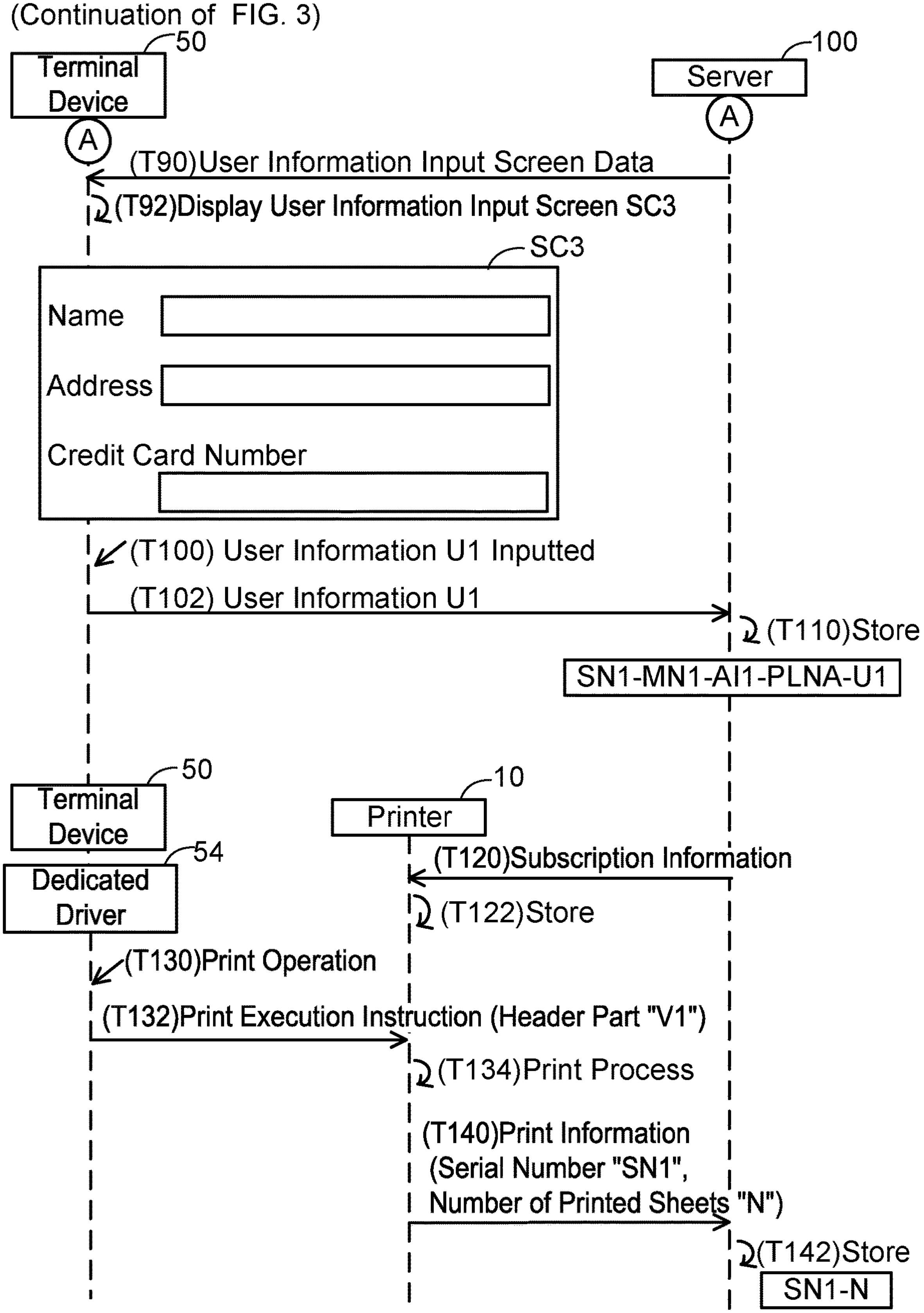
FIG. 4 illustrates a sequence diagram continued from FIG. 3.

(Process for Subscribing to Subscription Service; FIGS. 3 and 4)

Next, a process executed by each device when the user of the printer 10 subscribes to the subscription service will be described. In the following, instead of describing contents of processes with the CPUs of the devices as subjects of actions, the contents of the processes will be described with the devices themselves or the drivers as subjects of the actions. In the terminal device 50, software controls hardware such as the CPU via an OS. The fact that the software controls the hardware via the OS is suitably omitted in the explanation in the present disclosure.

At T10, the terminal device 50 accepts input of an IP address of the printer 10 from the user. In this case, the terminal device 50 sends an access request to the printer 10 at T12 using a web browser program (not illustrated). The access request is information to access a web server function of the printer 10. Each of the following processes executed by the terminal device 50 is also executed by the web browser program, unless there is an explanation that another program is used.

When the printer 10 receives the access request from the terminal device 50 at T12, the printer 10 sends top screen data representing a top screen to the terminal device 50 at T14.

When the terminal device 50 receives the top screen data from the printer 10 at T14, the terminal device 50 displays the top screen at T20. The top screen includes various information (e.g., status) about the printer 10, buttons for various settings, and a button for registration with the server 100. The terminal device 50 accepts selection of the button for registration with the server 100 at T22. In this case, at T30, the terminal device 50 sends, to the printer 10, selection information indicating that the button for registration with the server 100 has been selected.

When the printer 10 receives the selection information from the terminal device 50 at T30, the printer 10 sends a PIN request including the serial number SN1 and the model name MN1 to the server 100 at T32.

When the server 100 receives the PIN request from the printer 10 at T32, the server 100 generates a PIN code "1234" and stores the serial number SN1 and the model name MN1 included in the PIN request in the memory 134 in association with the generated PIN code "1234" at T34.

The server 100 then sends the PIN code "1234" to the printer 10 at T40. When the printer 10 receives the PIN code "1234" from the server 100 at T40, the printer 10 displays the PIN code "1234" at T42. Consequently, the user can see the PIN code "1234". Although not illustrated, a so-called always-on connection is established between the printer 10 and the server 100. By using the always-on connection, the server 100 can send a signal to the printer 10 across the firewall of the LAN6 to which the printer 10 belongs, even without receiving a request from the printer 10. In other words, the always-on connection is a connection that can execute server-push communication. The always-on connection is, for example, a connection in accordance with extensible Messaging and Presence Protocol (XMPP).

At T50, the terminal device 50 accepts input of account information AI1 from the user. The account information AI1 is information required to login to the server 100 and includes a user ID and a password. After accepting the input of the account information AI1 at T50, the terminal device 50 sends the account information AI1 to the server 100 at T52.

When the server 100 receives the account information AI1 from the terminal device 50 at T52, the server 100 sends PIN code input screen data representing a PIN code input screen SC1 to the terminal device 50 at T54.

When the terminal device 50 receives the PIN code input screen data from the server 100 at T54, the terminal device 50 displays the PIN code input screen SC1 at T60. The PIN code input screen SC1 includes a message prompting the user to input a PIN code, a PIN code input field, and an OK button.

At T62, the terminal device 50 accepts input of the PIN code "1234" in the PIN code input field and selection of the OK button from the user. In this case, the terminal device 50 sends the PIN code "1234" to the server 100 at T64.

When the server 100 receives the PIN code "1234" from the terminal device 50 at T64, the server 100 identifies one or more contracted plans for the printer having the model name MN1 associated with the PIN code "1234". Next, at T70, the server 100 sends to the terminal device 50 plan information screen data representing a plan information screen SC2 that includes the one or more contracted plans that have been identified.

When the terminal device 50 receives the plan information screen data from the server 100 at T70, the terminal device 50 displays the plan information screen SC2 at T72. The plan information screen SC2 includes contents of Plan A and Plan B. In this case, the terminal device 50 accepts selection of Plan A from the user at T80. In this case, the terminal device 50 sends selection information including plan information PLNA indicating the selected plan A to the server 100 at T82.

(Continuation of FIG. 3; FIG. 4)

When the server 100 receives the selected information from the terminal device 50 at T82, the server 100 sends user information input screen data representing user information input screen SC3 to the terminal device 50 at T90.

When the terminal device 50 receives the user information input screen data from the server 100 at T90, the terminal device 50 displays the user information input screen SC3 at T92. The user information input screen SC3 includes a user name input field, an address input field, and a credit card number input field.

When the terminal device 50 accepts input of the user information U1 (i.e., the user's name, address, and credit card number) from the user at T100, the terminal device 50 sends the inputted user information U1 to the server 100 at T102.

When the server 100 receives the user information U1 from the terminal device 50 at T102, the server 100 stores the account information AI1, the plan information PLNA, and the user information U1 in association with the serial number SN1 and the model name MN1 at T110. Consequently, the user can subscribe to Plan A of the subscription service. Furthermore, at T120, the server 100 sends the subscription information to the printer 10 using the always-on connection described above.

When the printer 10 receives the subscription information from the server 100 at T120, the printer 10 stores the subscription information in the memory 34 at T122.

When the dedicated driver 54 of the terminal device 50 receives a print operation from the user at T130, the dedicated driver 54 generates a print execution instruction including print data, and sends the print execution instruction to the printer 10 at T132. The header part of this print execution instruction includes the character string "V1".

When the printer 10 receives the print execution instruction at T132 (YES at S10 in FIG. 2), the printer 10 executes a print process according to the print execution instruction at T134. Next, at T140, the printer 10 sends the print information to the server 100. The print information includes the serial number SN1 of the printer 10 and the number of printed sheets N.

When the server 100 receives the print information from the printer 10 at T140, the server 100 stores the number of printed sheets "N" included in the print information in the memory 134 in association with the serial number SN1 included in the print information. Consequently, the server 100 can manage the number of copies printed by the printer 10 and provide the subscription service to the user of the printer 10.

Figure 5:
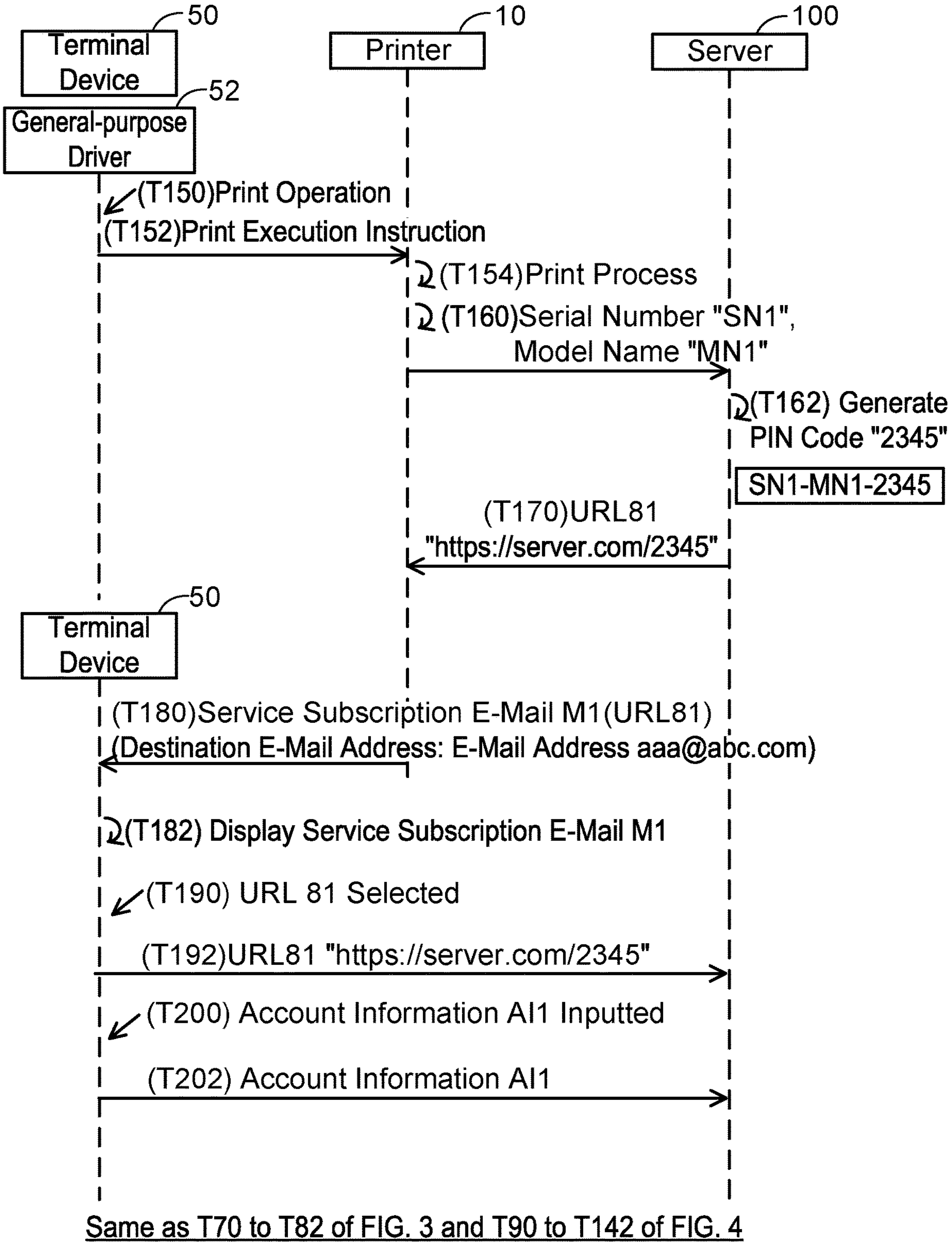
FIG. 5 illustrates a sequence diagram of Case B-1.

(Case B-1: FIG. 5)

Next, referring to FIG. 5, a case realized by the process of FIG. 2 will be described.

When the general-purpose driver 52 of the terminal device 50 accepts a print operation from the user at T150, the general-purpose driver 52 generates a print execution instruction, and sends the print execution instruction to the printer 10 at T152. The header part of this print execution instruction does not include the character string "V1".

When the printer 10 receives the print execution instruction at T152 (NO at S10 in FIG. 2), the printer 10 executes the print process according to the print execution instruction at T154. In the present case, the printer 10 does not store the subscription information (NO at S12). Therefore, at T160, the printer 10 sends the serial number SN1 and the model name MN1 to the server 100 (S20).

When the server 100 receives the serial number SN1 and the model name MN1 from the printer 10 at T160, the server 100 generates a PIN code "2345" and stores, in the memory 134, the serial number SN1, the model name MN1, and the PIN code "2345" in association with each other at T162. In this case, the server 100 sends a URL 81 including the PIN code "2345" to the printer 10 at T170.

When the printer 10 receives the URL 81 from the server 100 at T170 (S22), the printer 10 sends a service subscription e-mail M1 including the URL 81 with the e-mail address "aaa@abc.com" in the memory 34 as a recipient at T180 (S30).

The user has in advance stored in the terminal device 50 e-mail settings for receiving an e-mail sent with the e-mail address "aaa@abc.com" as a recipient. Therefore, the terminal device 50 receives the service subscription e-mail M1 from the printer 10 at T180. In this case, the terminal device 50 displays the service subscription e-mail M1 at T182 by using a mailer program (not illustrated). At T190, the terminal device 50 accepts selection of the URL 81 included in the service subscription e-mail M1 from the user. In this case, the terminal device 50 sends an access request including the URL 81 to the server 100 at T192.

When the server 100 receives the URL 81 from the terminal device 50 at T192, the server 100 obtains the PIN code "2345" included in the URL 81. Consequently, the server 100 can identify the serial number SN1 and the model name MN1 associated with the PIN code "2345" (see T162).

At T200, the terminal device 50 accepts input of the account information AI1 from the user. In this case, the terminal device 50 sends the account information AI1 to the server 100 at T202. The subsequent processes are the same as those of T70 to T82 of FIGS. 3 and T90 to T142 of FIG. 4. Consequently, the user can subscribe to Plan A of the subscription service.

Effects of Embodiment

The printer 10 sends the service subscription e-mail M1 (S30) when the print execution instruction is generated by the general-purpose driver 52 (NO at S10 in FIG. 2). Consequently, the printer 10 can properly prompt the user, who uses the general-purpose driver 52 to cause the printer 10 to execute printing, to subscribe to the subscription service. That is, the printer 10 can properly perform an offering of the service.

Although not illustrated in the flowcharts or in the sequences, when the print execution instruction is generated by the dedicated driver 54 and the user has not yet subscribed to the subscription service, the printer 10 sends a notification to the dedicated driver 54 to prompt the user to subscribe to the service upon completion of the print process. Consequently, the printer 10 can perform the offering for the service. Therefore, when the print execution instruction is generated by the dedicated driver 54 (YES at S10), the printer 10 does not send the service subscription e-mail M1. This is because the user may find it bothersome to receive the service subscription e-mail M1, since the user can receive the offering via the dedicated driver 54.

When the printer 10 receives the print execution instruction generated by the general-purpose driver 52 (NO at S10), the printer 10 sends the serial number SN1 and the model name MN1, which are necessary information to subscribe to the subscription service, to the server 100 (S20). Thus, the user can register the serial number SN1 and the model name MN1 with the server 100 more easily than in the case of FIG. 3, where input of the IP address is necessary (see T10 in FIG. 3).

The printer 10 receives the URL 81 including the PIN code "2345" from the server 100 (S22) and sends the service subscription e-mail M1 including the URL 81 with the e-mail address "aaa@abc.com" as a recipient (S30). That is, the URL 81 does not include the serial number SN1 or the model name MN1 that are associated with the PIN code "2345", and as a result, the service subscription e-mail M1 does not include the serial number SN1 or the model name MN1, either. Therefore, the risk of leakages of the serial number SN1 and the model name MN1 can be reduced.

(Corresponding Relationship)

The e-mail address "aaa@abc.com" is an example of "e-mail address". The service subscription e-mail M1 is an example of "predetermined information". The URL 81 is an example of "first URL". The subscription service is an example of "service related to the printer". The PIN code "2345" is an example of "authentication information". The serial number SN1 is an example of "unique identification information".

T154 in FIG. 5 is an example of "cause the print execution device to execute printing of an image". S30 is an example of "externally send predetermined information". S10 is an example of "determine whether the print execution instruction is generated by the general-purpose driver or the dedicated driver". S20 is an example of "send printer related information". S22 is an example of "receive a first Uniform Resource Locator (URL)".

Second Embodiment

Next, a printer 10 of the second embodiment will be described. The printer 10 of the present embodiment is the same as the printer 10 of the first embodiment, except that the process of S10 in FIG. 2 is different.

At S10 in FIG. 2, the CPU 32 determines whether a destination port number to which the print execution instruction is sent is a predetermined number other than "631". Here, the port number "631" is a port number used for communication according to the IPP scheme described above. Therefore, the fact that the port number is "631" means that the print execution instruction is generated by the general-purpose driver 52. The fact that the port number is a predetermined number other than "631" (i.e., a port number used for communication according to a protocol different from the IPP) means that the print execution instruction is generated by the dedicated driver 54. The CPU 32 can suitably determine whether the print execution instruction is generated by the dedicated driver 54 or the general-purpose driver 52 based on the destination port number to which the print execution instruction is sent (i.e., protocol).

When the destination port number is a predetermined number other than "631," that is, when the print execution instruction is generated by the dedicated driver 54, the CPU 32 determines YES at S10 and ends the process in FIG. 2. On the other hand, the CPU 32 determines NO at S10 and proceeds to S12 when the destination port number is "631", i.e., the print execution instruction is generated by the general-purpose driver 52.

Third Embodiment

A printer 10 of the present embodiment is the same as that of the first embodiment, except that the processes of S22 and S30 in FIG. 2 are different.

At S22, the CPU 32 receives a URL including the serial number SN1 and the model name MN1 from the server 100 instead of a URL including a PIN code. In this case, at S30, the CPU 32 sends a service subscription e-mail M1 with the e-mail address "aaa@abc.com" in the memory 34 as a recipient. The service subscription e-mail M1 of the present embodiment includes a URL 82 instead of the URL 81. The URL 82 includes address information of the server 100, the serial number SN1 and the model name MN1.

Figure 6:
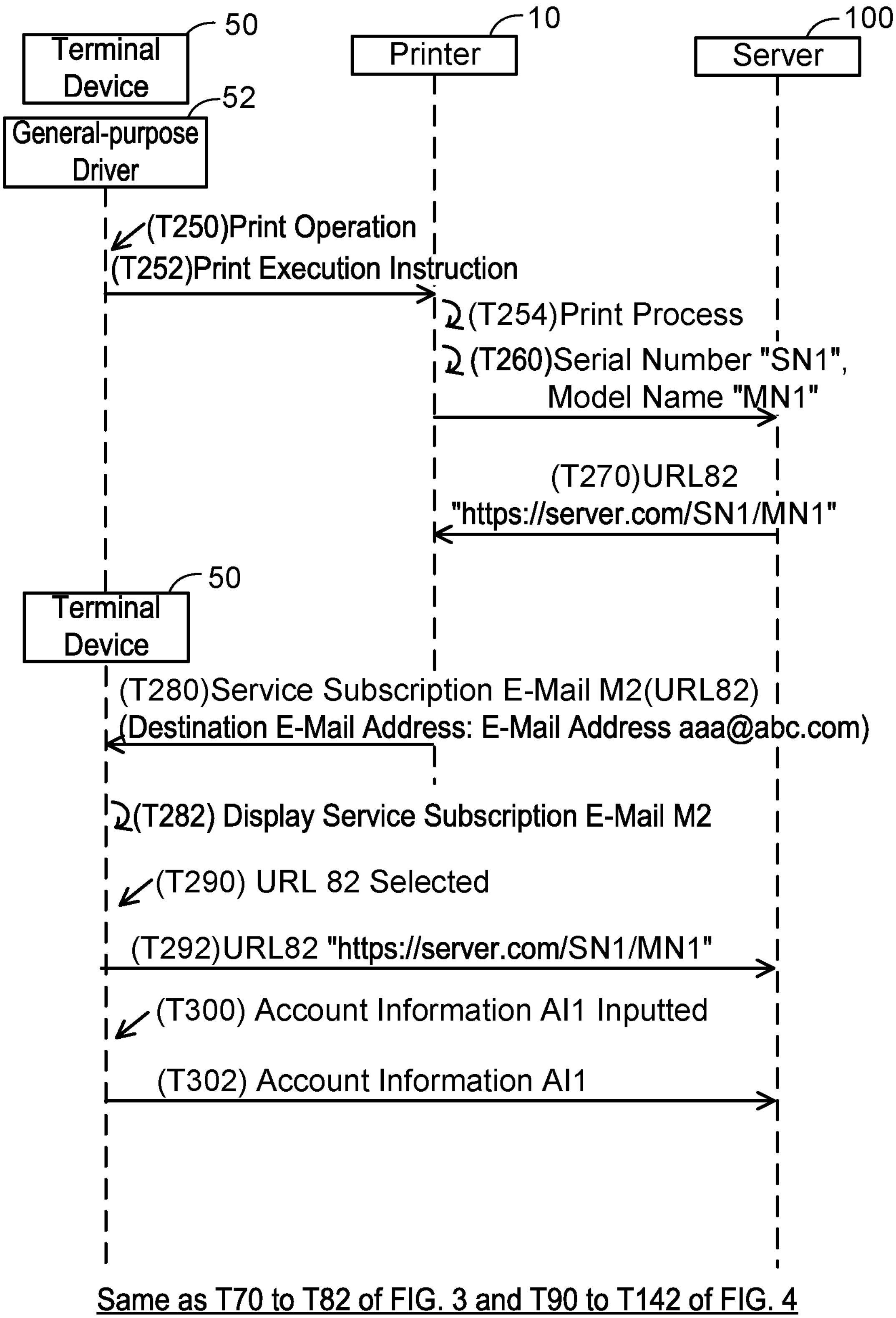
FIG. 6 illustrates a sequence diagram of Case B-2.

(Case B-2: FIG. 6)

Next, referring to FIG. 6, a case realized by the process of FIG. 2 of the present embodiment will be described. Processes of T250 to T260 are the same as those of T150 to T160 in FIG. 5.

When the server 100 receives the serial number SN1 and the model name MN1 from the printer 10 at T260, the server 100 sends the URL 82 including the serial number SN1 and the model name MN1 to the printer 10 at T270.

When the printer 10 receives the URL 82 from the server 100 at T270 (S22), the printer 10 sends the service subscription e-mail M2 including the URL 82 with the e-mail address "aaa@abc.com" as a recipient at T280 (S30).

When the terminal device 50 receives the service subscription e-mail M2 from the printer 10 at T280, the terminal device 50 displays the service subscription e-mail M2. Further, at T290, the terminal device 50 accepts selection of the URL 82 included in the service subscription e-mail M2. Thereby, the terminal device 50 sends an access request including the URL 82 to the server 100 at T292. Since the URL 82 includes the serial number SN1 and the model name MN1, the user can send the serial number SN1 and the model name MN1 to the server 100 without inputting the serial number SN1 or the model name MN1.

When the server 100 receives the URL 82 from the terminal device 50 at T292, the server 100 obtains the serial number SN1 and the model name MN1 included in the URL 82. Consequently, the server 100 can identify the serial number SN1 and the model name MN1 (see T260 in FIG. 6).

At T300, the terminal device 50 accepts input of the account information AI1 from the user and sends the account information AI1 to the server 100 at T302. The subsequent processes are the same as those of T70 to T82 in FIGS. 3 and T90 to T142 in FIG. 4. Consequently, the user can subscribe to Plan A of the subscription service. In the present embodiment, the URL 82 is an example of "second URL". S22 is an example of "receive a second Uniform Resource Locator (URL)".

Fourth Embodiment

A printer 10 of the present embodiment is the same as that of the first embodiment, except that the e-mail address "aaa@abc.com" is not stored in the memory 34 and the process of S30 in FIG. 2 is different.

At S30, the CPU 32 sends service screen data DI representing a service screen to the terminal device 50 by using the IP address of the sender of the print execution instruction. The service screen includes a message prompting the user to subscribe to the subscription service.

Figure 7:
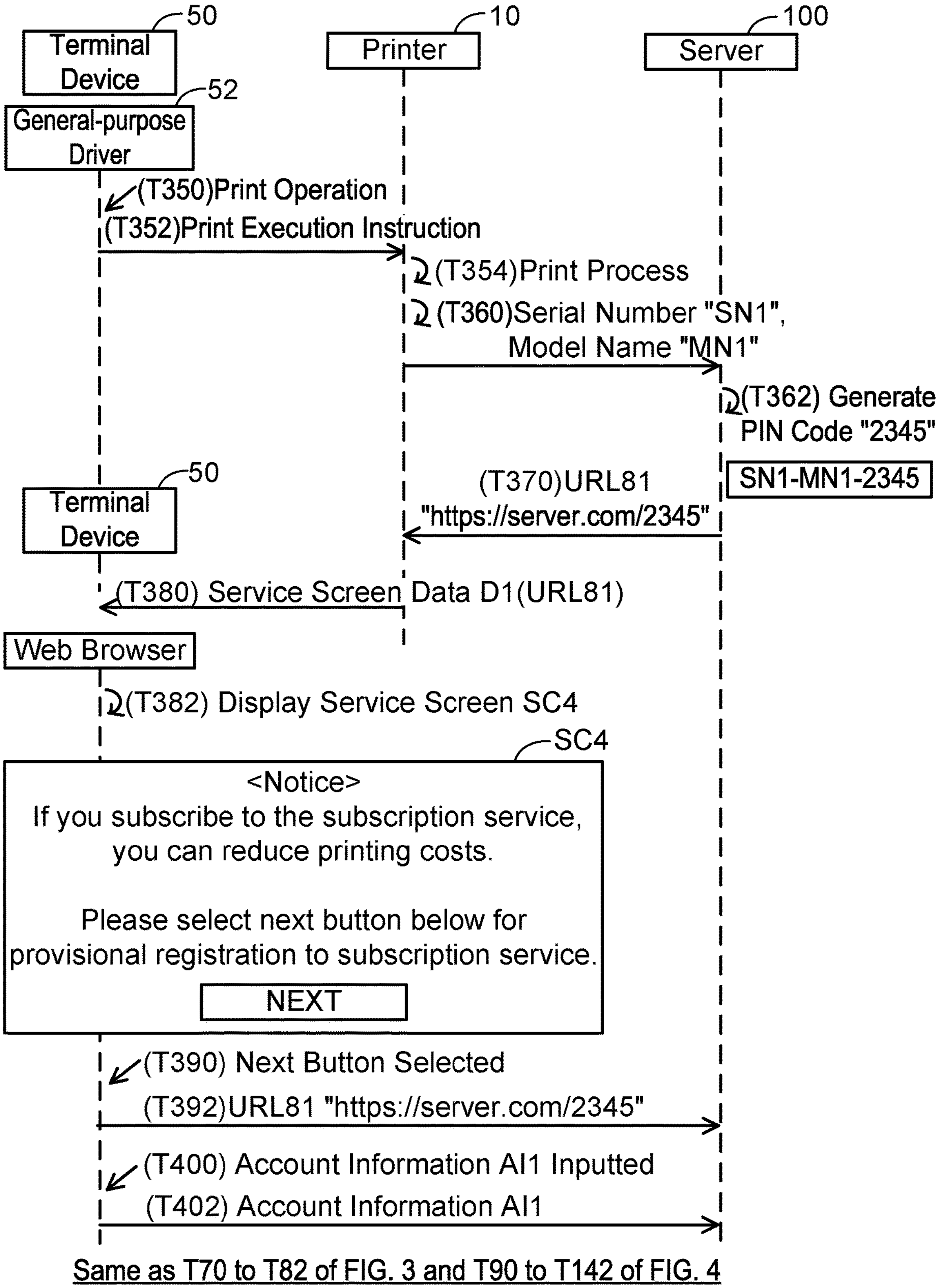
FIG. 7 illustrates a sequence diagram of Case B-3.

(Case B-3: FIG. 7)

Next, referring to FIG. 7, a case realized by the process of FIG. 2 of the present embodiment will be described. Processes of T350 to T370 are the same as those of T150 to T170 of FIG. 5.

When the printer 10 receives the URL 81 including the PIN code "2345" from the server 100 at T370 (S22), the printer 10 generates service screen data DI including the URL 81 at T372. Next, at T380, the printer 10 sends the service screen data DI to the terminal device 50 by using the IP address of the sender of the print execution instruction (S30). In a modification, the printer 10 may receive the service screen data DI from the server 100 at T370. In this case, the printer 10 sends the service screen data DI to the terminal device 50 at T380 without generating the service screen data DI.

When the terminal device 50 receives the service screen data DI from the printer 10 at T380, the terminal device 50 supplies the service screen data DI to the web browser of the terminal device 50 at T382. As a result, the web browser of the terminal device 50 displays the service screen SC4.

The service screen SC4 includes a message prompting the user to subscribe to the subscription service and a NEXT button for performing a provisional registration for the subscription service. At T390, the web browser accepts selection of the NEXT button included in the service screen SC4. In this case, the web browser sends an access request including the URL 81 included in the service screen data DI to the server 100 at T392.

The terminal device 50 accepts input of the account information AI1 from the user at T400 and sends the account information AI1 to the server 100 at T402. The subsequent processes are the same as those of T70 to T82 in FIGS. 3 and T90 to T142 in FIG. 4. Consequently, the user can subscribe to Plan A of the subscription service. In the present embodiment, the printer 10 sends the service screen data DI to the terminal device 50 by using the IP address of the sender of the print execution instruction. This eliminates the need for memory 34 to store the user's e-mail address. In addition, since the service screen SC4 is automatically displayed in the web browser of the terminal device 50, the user does not need to execute the operation to start the mailer program on the terminal device 50. In the present embodiment, the service screen SC4 is an example of "webpage" and the service screen data DI is an example of "webpage data".

Fifth Embodiment

A printer 10 of the present embodiment is the same as that of the first embodiment, except that the e-mail address "aaa@abc.com" is not stored in the memory 34 and the process of S30 in FIG. 2 is different.

At S30, the CPU 32 sends a URL 83 to the terminal device 50 by using the IP address of the sender of the print execution instruction. In the present embodiment, the URL 83 indicates an address of the service screen data DI (see FIG. 7) in the server 100. In a modification, the URL 83 may indicate an address in a different server than server 100.

Figure 8:
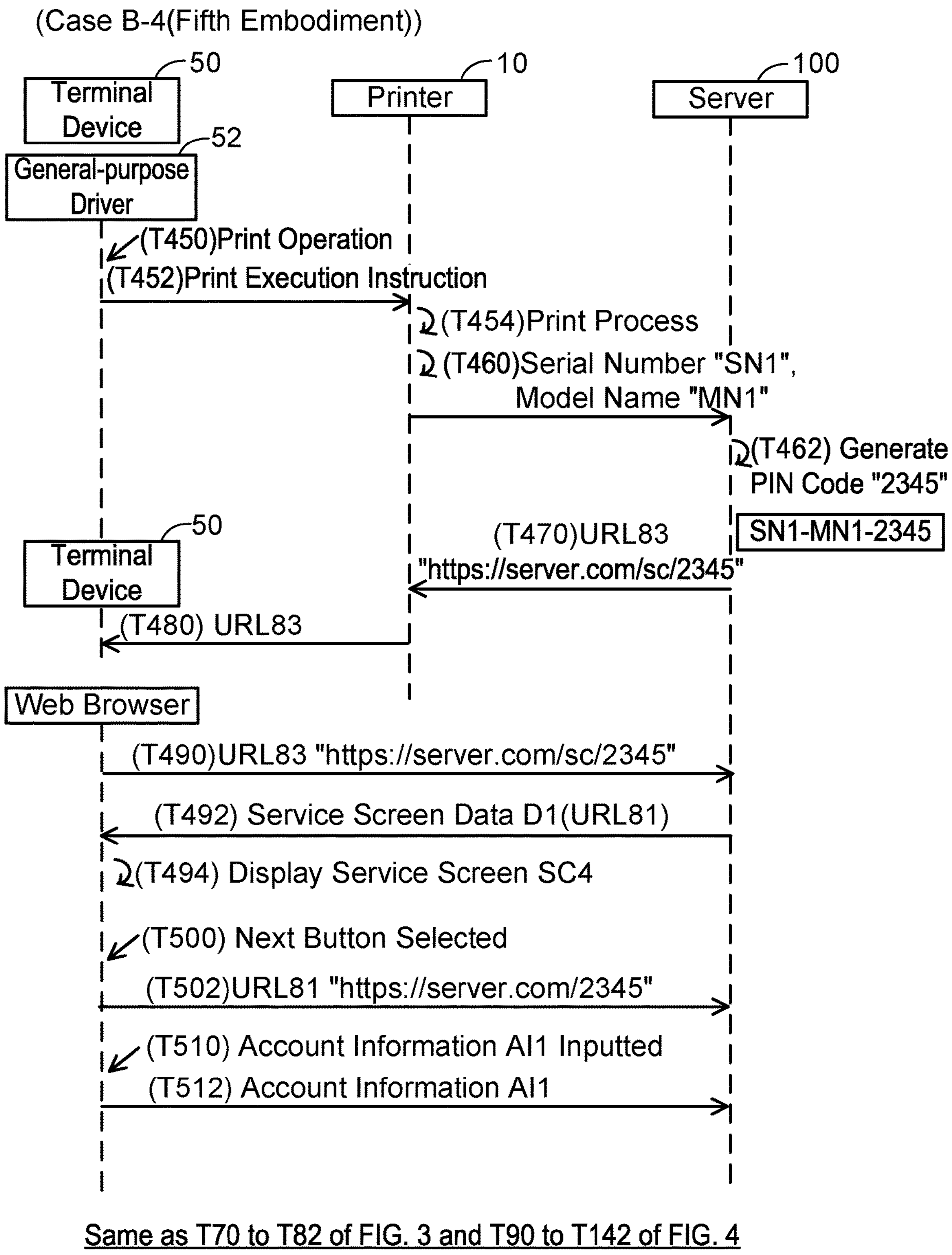
FIG. 8 illustrates a sequence diagram of Case B-4.

(Case B-4 FIG. 8)

Next, referring to FIG. 8, a case realized by the process of FIG. 2 of the present embodiment will be described. Processes of T450 to T462 are the same as those of T150 to T162 in FIG. 5.

When the server 100 generates the PIN code "2345" at T462, the server 100 stores the serial number SN1, the model name MN1 and the PIN code "2345" in the memory 134 in association with each other, and sends the URL 83 to the printer 10 at T470. The URL 83 indicates the address of the service screen data DI and includes the PIN code "2345".

When the printer 10 receives the URL83 from the server 100 at T470 (S22), the printer 10 sends the URL83 to the terminal device 50 at T480 (S30) by using the IP address of the sender of the print execution instruction. In a modification, the printer 10 may receive only the PIN code "2345" from the server 100 at T470, generate the URL 83 including the PIN code "2345", and send the generated URL 83 to the terminal device 50 at T480.

When the terminal device 50 receives the URL83 from the printer 10 at T480, the terminal device 50 supplies the URL83 to the web browser of the terminal device 50. Consequently, the web browser sends the URL83 to the server 100 at T490, and receives the service screen data DI that exists at the address indicated by the URL83 from the server 100 at T492. The service screen data DI includes the URL 81 including the PIN code "2345". The web browser displays the service screen SC4 (see FIG. 7) at T494.

The processes of T500 to T512 are the same as those of T390 to T402 in FIG. 7. The subsequent processes are the same as those of T70 to T82 in FIGS. 3 and T90 to T142 in FIG. 4. Consequently, the user can subscribe to Plan A of the subscription service. In the present embodiment, the URL 83 is an example of a "a Uniform Resource Locator (URL) indicating an address of a webpage related to subscription to the service".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) Instead of sending the service subscription e-mail M1, the printer 10 may send to the terminal device 50 a message to prompt the user to subscribe to the subscription service by using a communication application to realize communication of messages, photos, videos, and the like. In such a case, the memory 34 of the printer 10 stores, instead of the email address "aaa@abc.com", identification information to execute the communication with the terminal device 50 using the communication application described above. In the present modification, the memory 34 configured to store this identification information is an example of "memory". When the printer 10 is connectable to a telephone line, the memory 34 of the printer 10 may store the telephone number of the user's cell phone instead of the e-mail address "aaa@abc.com". In that case, the printer 10 may use this telephone number to send a short message prompting the user to subscribe to the subscription service. In this modification, the memory 34 configured to store the telephone number is an example of "memory".

(Modification 2) The "service" is not limited to the service in the embodiments above. For example, the "service" may be a service to automatically ship color material cartridge(s) that can be installed in the printer 10, or a service to provide special image processing on printed image(s).

(Modification 3) The CPU 32 may not execute the process of S12 in FIG. 2. In general terms, the CPU 32 may be configured to display a predetermined screen on the display unit when the print execution instruction is received from the terminal device and the print execution instruction is generated by the general-purpose driver, regardless of whether the subscription information is stored in the memory.

(Modification 4) The CPU 32 may not execute the process of S20 in FIG. 2. In the present modification, the process of S22 may not by executed, and the service subscription e-mail M1 may not include the URL 81. In the present modification, "send a printer related information related to the printer to a server", "receive a first Uniform Resource Locator (URL) including the authentication information from the server", and "receive a second Uniform Resource Locator (URL) including the printer related information from the server" can be omitted.

(Modification 5) The CPU 32 may send only one of the serial number SN1 and the model name MN1 to server 100 at S30 of FIG. 2. The CPU 32 may send user information (e.g., name, address, etc.) that is pre-registered with the printer 10 to the server 100, for example, without sending either the serial number SN1 or the model name MN1 to the server 100. In the present modification, the user information is an example of "printer related information".

(Modification 6) The service screen SC4 in FIG. 7 may not include the message prompting the user to subscribe to the subscription service. In general term, the predetermined information may not include a message related to the subscription to the service.

(Modification 7) In the above embodiments, the processes of FIGS. 2, 5, 6 are implemented by the CPU 32 executing the program 36. Instead of this, any of the processes of FIGS. 2, 5, 6 may be implemented by hardware such as a logic circuit.

(Modification 8) In the above embodiments, an example where the printer 10 sends the service subscription e-mail M1 when the print execution instruction is generated by the general-purpose driver 52 and the printer 10 does not send the service subscription e-mail M1 when the print execution instruction is generated by the dedicated driver 54 was described. However, the printer 10 may send the service subscription e-mail M1 even when the print execution instruction is generated by the dedicated driver 54. When the user does not receive the offering via the dedicated driver 54, the printer 10 can properly offer the service to the user by the printer 10 sending the service subscription e-mail M1. Further, even when the user receives the offering via the dedicated driver 54, the user may still want the printer 10 to send the service subscription e-mail M1. In other words, even when the print execution instruction is generated by the dedicated driver 54, the printer 10 may still externally send the predetermined information related to the subscription to the service related to the printer.

(Modification 9) In the above embodiments, an example where the printer 10 sends the service screen data DI to the terminal device 50 when the print execution instruction is generated by the general-purpose driver 52, and the printer 10 does not send the service screen data DI to the terminal device 50 when the print execution instruction is generated by the dedicated driver 54 was described. However, even when the print execution instruction is generated by the dedicated driver 54, the printer may send the service screen data DI to the printer 10. When the user does not receive the offering via the dedicated driver 54, the service can properly be offered to the user by the printer 10 sending the service screen data DI to the terminal device 50. Further, even when the user receives the offering via the dedicated driver 54, the user may still want the printer 10 to send the service screen data DI to the terminal device 50.

(Modification 10) In the above embodiments, an example where the printer 10 sends the URL 83 to the terminal device 50 when the print execution instruction is generated by general-purpose driver 52, and the printer 10 does not send the URL 83 to the terminal device 50 when the print execution instruction is generated by the dedicated driver 54 was described. However, even when the print execution instruction is generated by the dedicated driver 54, the printer 10 may send the URL 83 to the terminal device 50. When the user does not receive the offering via the dedicated driver 54, the service can properly be offered to the user by the printer 10 sending the URL 83 to the terminal device 50. Further, even when the user receives the offering via the dedicated driver 54, the user may still want the printer 10 to sent the URL 83 to the terminal device 50.

What is claimed is:

1. A printer comprising:
a print execution device; and
a controller,
wherein the controller is configured to:
in a case where a print execution instruction is received from a terminal device, cause the print execution device to execute printing of an image according to the print execution instruction;
determine whether the print execution instruction has been generated by a general-purpose driver not provided by a vendor of the printer; and
based on a result of the determination that the print execution instruction has been generated by the general-purpose driver, send predetermined information related to a subscription to a service related to the printer to an external device.

2. The printer as in claim 1, wherein in a case where the print execution instruction is received from the terminal device and the print execution instruction is generated by a dedicated driver provided by the vendor of the printer, the predetermined information is not sent to the external device.

3. The printer as in claim 2, further comprising a memory configured to store subscription information indicating that an individual or a company using the printer has already subscribed to the service, wherein
the controller is configured to:
send the predetermined information to the external device in a case where the print execution instruction is received from the terminal device, the print execution instruction is generated by the general-purpose driver, and the subscription information is not stored in the memory, and
the predetermined information is not sent to the external device in a case where the print execution instruction is received from the terminal device, the print execution instruction is generated by the general-purpose driver, and the subscription information is stored in the memory.

4. The printer as in claim 2, wherein
the controller is further configured to:
in the case where the print execution instruction is received from the terminal device, determine whether the print execution instruction is generated by the general-purpose driver or the dedicated driver,
in a case where the print execution instruction does not include a predetermined character string corresponding to the vendor, determine that the print execution instruction is generated by the general-purpose driver, and
in a case where the print execution instruction includes the predetermined character string, determine that the print execution instruction is generated by the dedicated driver.

5. The printer as in claim 2, wherein
the controller is further configured to:
in the case where the print execution instruction is received from the terminal device, determine whether the print execution instruction is generated by the general-purpose driver or the dedicated driver,
in a case where the print execution instruction is an instruction according to a first protocol, determine that the print execution instruction is generated by the general-purpose driver, and
in a case where the print execution instruction is an instruction according to a second protocol being different from the first protocol, determine that the print execution instruction is generated by the dedicated driver.

6. The printer as in claim 1, wherein
the controller is further configured to:
in the case where the print execution instruction is received from the terminal device, send printer related information related to the printer to a server.

7. The printer as in claim 6, wherein
in a case where the printer related information is sent to the server, the server is configured to store the printer related information in association with authentication information,
the controller is further configured to receive a first Uniform Resource Locator (URL) including the authentication information from the server, and,
the predetermined information includes the first URL.

8. The printer as in claim 6, wherein
the controller is further configured to receive a second Uniform Resource Locator (URL) including the printer related information from the server, and
the predetermined information includes the second URL.

9. The printer as in claim 6, wherein,
the printer related information includes unique identification information for identifying the printer.

10. The printer as in claim 5, wherein
the printer related information includes a model name of the printer.

11. The printer as in claim 1, further comprising a memory configured to store an e-mail address, wherein
the controller is configured to send the predetermined information with the e-mail address in the memory as a recipient to the external device.

12. The printer as in claim 1, wherein
the external device includes the terminal device.

13. The printer as in claim 11, wherein
The predetermined information includes webpage data that represents a webpage related to the subscription to the service.

14. The printer as in claim 1, wherein
The predetermined information includes a message related to the subscription to the service.

15. The printer as in claim 1, wherein
the predetermined information includes a Uniform Resource Locator (URL) indicating an address of a webpage related to the subscription to the service.

16. A non-transitory computer-readable recording medium storing computer-readable instructions for a printer,
wherein the computer-readable instructions, when executed by a processor of the printer, cause the printer to:
in a case where a print execution instruction is received from a terminal device, cause a print execution device of the printer to execute printing of an image according to the print execution instruction;
determine whether the print execution instruction has been generated by a general-purpose driver not provided by a vendor of the printer; and
based on a result of the determination that the print execution instruction has been generated by the general-purpose driver, send predetermined information related to a service related to the printer to an external device.

17. A method for controlling a printer with a controller, the method comprising:

in a case where a print execution instruction is received from a terminal device, causing a print execution device of the printer to execute printing of an image according to the print execution instruction;

determining, by the controller, whether the print execution instruction has been generated by a general-purpose driver not provided by a vendor of the printer; and based on a result of the determination that the print execution instruction has been generated by the general-purpose driver, sending, by the controller, predetermined information related to a service related to the printer to an external device.

* * * * *